(12) United States Patent
Cheng et al.

(10) Patent No.: US 8,159,505 B2
(45) Date of Patent: Apr. 17, 2012

(54) SYSTEM AND METHOD FOR EFFICIENT DIGITAL VIDEO COMPOSITION

(75) Inventors: Jeffrey Cheng, Toronto (CA); Kenneth Man, Richmond Hill (CA); Daniel Wong, Cupertino, CA (US); Catalin Beju, Bolton (CA); Geoffrey Park, Toronto (CA); Iouri Kiselev, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 744 days.

(21) Appl. No.: 12/243,596

(22) Filed: Oct. 1, 2008

(65) Prior Publication Data

US 2010/0079489 A1    Apr. 1, 2010

(51) Int. Cl.
*G09G 5/00* (2006.01)
*G06T 1/00* (2006.01)

(52) U.S. Cl. ........................................ 345/629
(58) Field of Classification Search .......... 345/629, 345/634, 638
See application file for complete search history.

(56) References Cited

U.S. PATENT DOCUMENTS 6,545,685 B1 * 4/2003 Dorbie ........................ 345/629
6,903,753 B1 * 6/2005 Gray, III et al. ............. 345/634

OTHER PUBLICATIONS

Craig M. Wittenbrink; Irregular grid volume rendering with composition networks; Jan. 25, 1998; IS&T/SPIE Conference on Visual Data Exploration and Analysis V.; SPIE vol. 3298; pp. 250-260.*
Blythe, David, "The Direct3D 10 System", Microsoft Corporation, 2006, ACM.
Segal, Mark and Akeley, Kurt, "The Design of the OpenGL Graphics Interface", Silicon Graphics Computer Systems, 1994, pp. 1-10, Silicon Graphics, Inc., Mountain View, CA.

* cited by examiner

*Primary Examiner* — Jeffery A Brier
(74) *Attorney, Agent, or Firm* — Faegre Baker Daniels LLP

(57) ABSTRACT

An efficient method of compositing planes onto a target surface using a computing device with graphics processing capability is disclosed. The method includes partitioning the target surface, on which planes are composited, into partitions. Each one of the partitions contains connected pixels to be formed by compositing an identical subset of the planes to be composited. Each partition is associated with a corresponding subset of the planes. Each partition and its corresponding set of associated planes are then provided to a graphics processor for composition, using exemplary software components including an application programming interface, a library and device driver software. An image is formed on the target surface by compositing each partition. Using the disclosed method, a single pass through stages of the graphics pipeline for the graphics processor is sufficient to composite multiple planes to form an image on the target surface.

36 Claims, 13 Drawing Sheets

| Partition | Layer-0 | Layer-1 | Layer-2 | Layer-3 |
|---|---|---|---|---|
| 802 | * | | | |
| 804 | * | | | |
| 806 | * | * | | |
| 808 | * | | | |
| 810 | * | | | |
| 812 | * | * | | |
| 814 | * | * | * | |
| 816 | * | | * | |
| 818 | * | | | |
| 820 | * | | | |
| 822 | * | * | | |
| 824 | * | * | * | |
| 826 | * | * | * | * |
| 828 | * | * | * | |
| 830 | * | | * | |
| 832 | * | | | |
| 834 | * | | | |
| 836 | * | | * | |
| 838 | * | | * | * |
| 840 | * | | * | |
| 842 | * | | | |
| 844 | * | | | |
| 846 | * | | * | |
| 848 | * | | | |
| 850 | * | | | |

FIG. 11

| Plane | Source | Color Space | Alpha | Size | fps |
|---|---|---|---|---|---|
| Main Video | Blu-Ray, HD-DVD | YUV (4:2:0) YUV (4:2:2) | No | 1920x1080 1280x720 | 30 fps (interlaced), 24p, 25p 24p, 25p, 30p, 50p, 60p |
| SubVideo | Blu-Ray, HD-DVD | YUV (4:2:0) YUV (4:2:2) | Luma Key (Range), global planar alpha | 720x480 720x576 | 30 fps (interlaced), 24fps 25 fps (interlaced) |
| Background Plane | Blu-Ray | RGB | N/A | 1920x1080 | 1 fps |
| Java Plane, Graphics Plane | Blu-Ray, HD-DVD | ARGB | per pixel alpha, global planar alpha | 1920x1080 | Same as Main Video |
| UI Plane | Player App. | ARGB | per pixel alpha, global planar alpha | Same as Video Window | N/A |
| Subtitle | Blu-Ray, HD-DVD | ARGB | per pixel alpha, global planar alpha | 1920x1080 | Same as Main Video |

FIG. 13

SYSTEM AND METHOD FOR EFFICIENT DIGITAL VIDEO COMPOSITION

FIELD OF THE INVENTION

The present invention relates generally to digital video processing, and more particularly to digital video composition.

BACKGROUND OF THE INVENTION

Digital video in general and high definition digital video in particular, are becoming widely used in a variety of display devices for educational, business and consumer entertainment applications. The cost of digital video processing continues to fall and as a result the benefits of digital manipulation of video signals over analog alternatives have become more compelling. Digital processing of video signals relies on a variety of techniques related to sampling and quantization, compression, encoding, modulation, error correction, post processing and the like; which are often used in complementary ways to achieve high quality video transmission or storage at reduced overall bandwidth or storage capacity requirements.

As a result, digital video is now fairly ubiquitous and can be found in a variety of computing devices such as personal computer workstations and laptop computers, and even in handheld devices such as cellular telephones, personal digital assistant devices, and portable music and video players.

In most digital devices that display images, a circuit responsible for graphics processing such as a graphics processing unit (GPU), an integrated graphics processor (IGP), a digital signal processor (DSP), or even a central processing unit (CPU) is used. When available, dedicated graphics processing circuits such as GPUs are often utilized by application software to process, composite and render digital images to interconnected displays. This is typically accomplished by providing graphics data and associated instructions to a graphics processing circuit, through an application programming interface (API) defined for that purpose. The use of a graphics API enables relatively high level application programs to take advantage of processing capabilities typically available on a graphics processor.

A graphics processor manipulates received graphics data, which may be representative of a three dimensional scene, and outputs a two dimensional image for viewing, using a sequence of stages collectively called a graphics pipeline. In some devices, these stages may include an input assembler, various shaders such as a vertex shader and a pixel shader and an output merger. Each stage may read/write its input/output data respectively, into buffers formed inside a video memory or frame buffer memory accessible to the graphics processor.

In a typical computing device, various stages of the graphics pipeline may have an associated API that exposes capabilities of the graphics processor that are suited for the stage to application software. As a result, multiple APIs are typically used by application software to render graphics.

Modern video data sources such as high definition digital television (HDTV) video sequences stored on Blu-ray or HD DVD discs often require video processing using a graphics processor. For example, Blu-ray discs typically contain multiple multi-layer video that requires blending or compositing multiple planes to form composited images for display. This typically requires multiple passes through the pipeline to compute the contributions of each plane in order to form the image to the target surface.

Unfortunately, such multi-stage multi-pass compositing may be inefficient, leading to multiple read and write operations that often result in the need for increased video memory bandwidth. In addition, multi-pass compositing often requires larger video memory sizes associated with intermediate buffers; and increased shader processing abilities to meet time constraints imposed by a particular output frame rate. Moreover, multi-stage, multi-pass compositing increases the power consumption of the graphics processor, and often requires a more complex application programming model involving difficult synchronization schemes to be implemented across stages.

Accordingly, there is a need for efficient for improved methods and devices for compositing video.

SUMMARY OF THE INVENTION

A method of compositing planes onto a target surface is disclosed. The method involves the use of a processor equipped to handle graphics processing such as a computing device that includes a graphics processor. The method includes partitioning the target surface, on which planes are composited, into partitions. Each one of the partitions contains connected pixels to be formed by compositing an identical set of planes. That is, each pixel in a given partition is to be composited from the same planes. Each partition is associated with its corresponding subset of associated planes. Pixels in each partition are then formed by compositing corresponding pixels from the subset of planes associated with the partition. A graphics processor may be used for composition. Exemplary software components including an application programming interface, a library and device driver software may be used to transfer the planes and the partitions to the graphics processor. A final image is formed on the target surface by compositing each partition. A single pass through a graphics pipeline of the processor may accomplish the composition of multiple planes to form an image.

In accordance with one aspect of the present invention, there is provided a method of compositing a plurality of planes including at least a first plane and a second plane onto a target surface. The method includes dividing the surface into partitions, each partition made up of connected pixels to be composited from the same subset of the plurality of planes associated with the each partition. The partitions include at least a first partition to be composited from at least both the first and second planes; a second partition to be composited from at least the first plane but not the second plane; and a third partition to be composited from at least the second plane but not the first plane. The method also includes compositing pixels for each of the partitions from corresponding pixels of the associated subset of planes to render an image on the target surface.

In accordance with another aspect of the present invention there is provided a computer readable medium storing processor executable instructions for forming an image on a surface by compositing a plurality of planes. The instructions include instructions for dividing the surface into partitions. Each partition made up of connected pixels to be composited from the same subset of the plurality of planes associated with the each partition. The partitions include at least a first partition to be composited from at least both the first and second planes, a second partition to be composited from at least the first plane but not the second plane, and a third partition to be composited from at least the second plane but not the first plane. The processor executable instructions further include instructions for compositing pixels for each of the partitions from corresponding pixels of the associated subset of planes to render the image on the target surface using the graphics processor.

In accordance with another aspect of the present invention there is provided a device including a processor in communication with memory. The memory stores processor executable instructions including instructions causing the processor to receive a plurality of planes to be composited to form an image on a target surface and to divide the surface into partitions. Each partition is made up of connected pixels to be composited from the same subset of the plurality of planes associated with the each partition. The partitions include at least a first partition to be composited from at least both the first and second planes; a second partition to be composited from at least the first plane but not the second plane; and a third partition to be composited from at least the second plane but not the first plane. The processor executable instructions also include instructions to composite pixels for each of the partitions from corresponding pixels of the associated subset of planes thereby rendering the image on the target surface.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 11 is a table depicting the list of layers or planes, associated with each partition of FIG. 9;

FIG. 13 is a table of some exemplary formats for planes to be composited using specific embodiments of the present invention.

DETAILED DESCRIPTION

Figure 1:
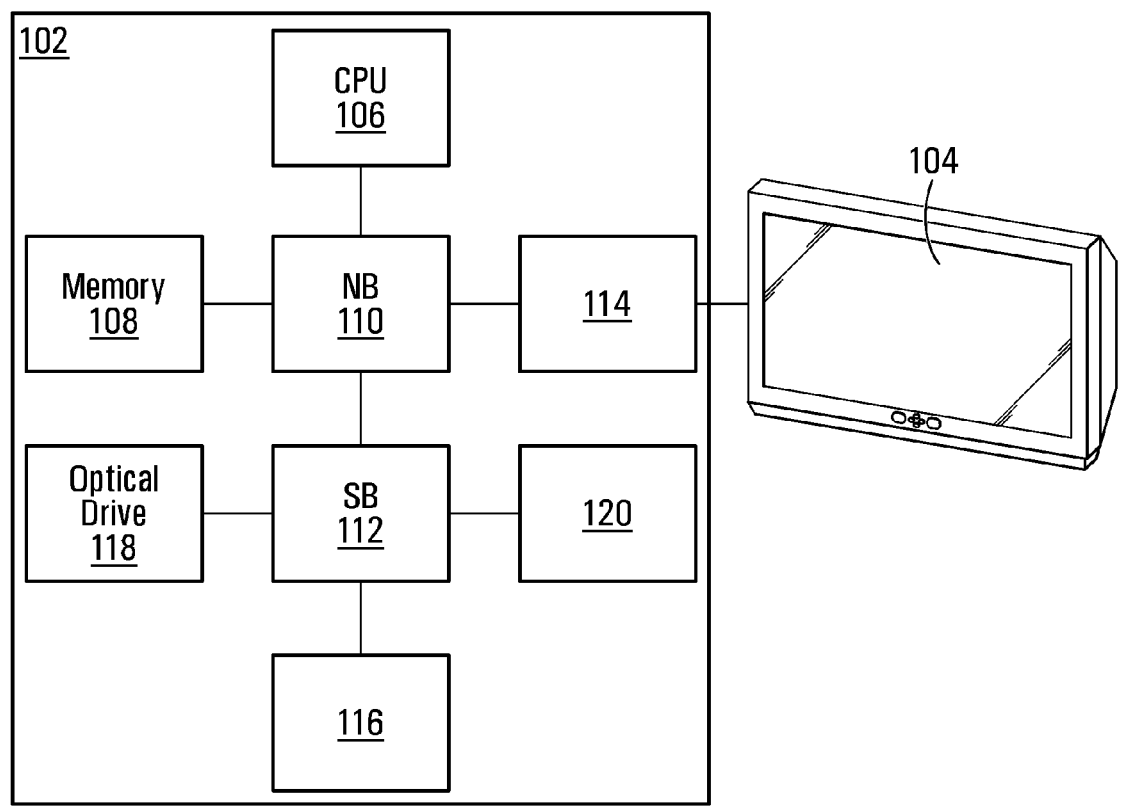
FIG. 1 is a simplified block diagram of computing device including a graphics processor, interconnected to a display device.

FIG. 1 illustrates a simplified block diagram of computing device 102 interconnected to a display device 104. Computing device 102 includes a processor 106 which may be a general purpose processor such as a conventional central processing unit (CPU). Processor 106 may be a microprocessor that has the x86 or x86-64 processor architecture. Alternatively, processor 106 may also have the PowerPC, SPARC or other architectures. Processor 106 is interconnected to memory and peripherals, through integrated interface circuits 110 and 112.

Integrated interface circuits 110 and 112 are sometimes referred to as North Bridge and South Bridge respectively, and are used to facilitate data communication between processor 106, peripheral units and memory 108.

The North Bridge interface circuit 110 may interconnect processor 106 with a graphics processor 114, a block of system memory 108 and the South Bridge interface circuit 112. The South Bridge interface circuit 112 in turn may interconnect lower speed peripheral devices such as a network interface card (NIC) 116, a drive 118, audio adapter 120 (i.e., a sound card) and other lower speed peripherals (not specifically illustrated).

A high speed expansion bus such as the Peripheral Component Interconnect Express (PCIe) may be used to interconnect the North Bridge interface circuit 110 with processor 106, graphics processor 114, memory 108 and the South Bridge interface circuit 112.

Graphics processor 114 may be an application specific integrated circuit (ASIC) formed on a graphics adapter expansion card such as a PCIe graphics card. Alternately, graphics processor 114 may be formed on a motherboard of computing device 102. In some embodiments graphics processor 114 and the North Bridge interface circuit 110 may be integrated. In other embodiments, the North Bridge interface circuit 110 and the South Bridge interface circuit 112 may be combined into a single circuit or ASIC on the motherboard of device 102. Yet other embodiments may combine processor 106, the North Bridge integrated interface circuit 110 and graphics processor 114 into a single integrated circuit. Other variations are possible.

Drive 118 may be an optical disc drive such as a Blu-ray, DVD or HD DVD drive, capable of reading a Blu-ray, DVD or HD DVD disc, containing multi-layer or multi-stream video. As may be appreciated, decoding and displaying multi-stream video involves decoding of each of the streams or layers from the disc, to form individual planes and compositing the planes together to form a final image for display.

Figure 2:
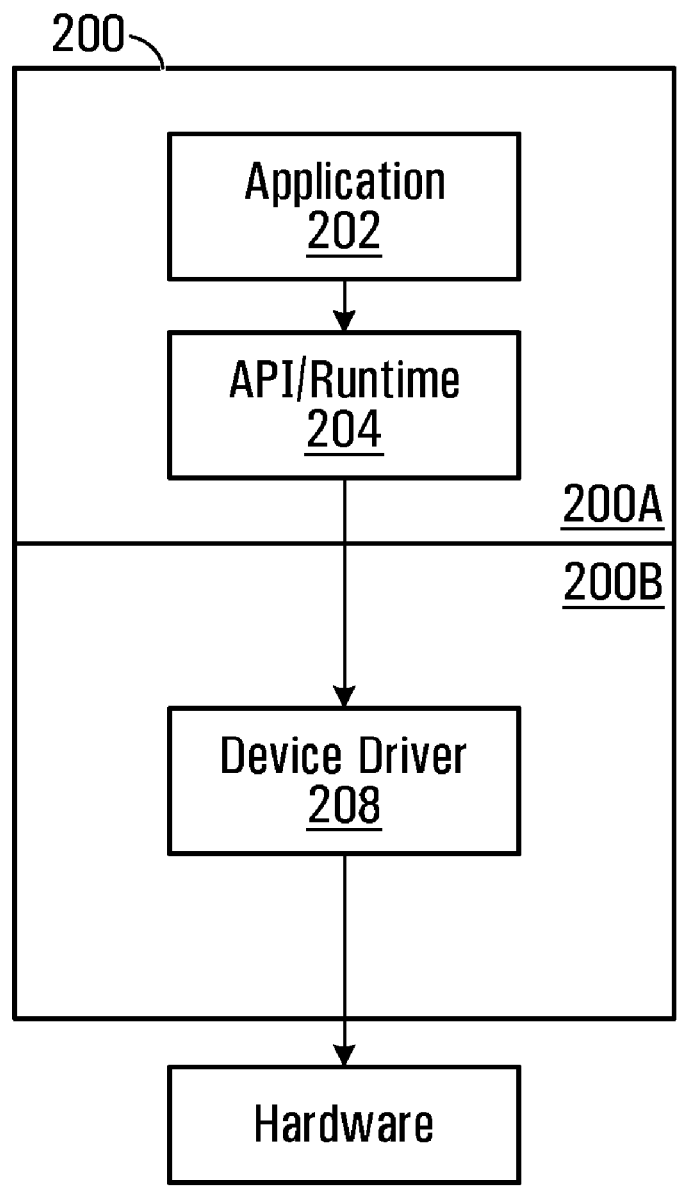
FIG. 2 is a simplified logical diagram of various conventional software modules, including an operating system, executing in the computing device of FIG. 1.

FIG. 2 depicts a simplified logical diagram of conventional software modules including an operating system 200, which may reside in memory 108, and execute on processor 106. A conventional application 202, which may be video player, interacts with graphics processor 114 through a conventional API/graphics runtime 204. Accordingly, application 202 may make API calls into conventional graphics runtime 204 which may in turn call appropriate driver routines in conventional device driver 208. Application 202 and graphics runtime 202 typically reside in a user space 200A of operating system 200 while device driver 208 typically resides, at least in part, in kernel space 200B of operating system 200.

Software applications such as application 202 that are designed to take advantage of graphics hardware often utilize graphics runtime 202 through a specific application programming interface (API). The API provides interfaces to routines in graphics runtime 204 that interact with device driver 208.

As will be appreciated, device driver 208 is typically specifically written for the underlying graphics processor 114.

Several graphics runtimes and associated APIs have become widely popular over the last few years. Two of the most common are the OpenGL cross-platform API developed by Silicon Graphics Inc. and DirectX™ developed by Microsoft Corp., and typically used in the Windows™ family of operating systems. Others will be known to those of ordinary skill in the art.

Application software does not typically communicate directly with graphics hardware. Instead application software calls routines in a graphics library using a predetermined API. The graphics library communicates with a lower level device driver code, which in turn performs actual data exchange with the graphics processor hardware.

As may be appreciated, standardized graphics library commands allow application software developers to take advantage prewritten functions without knowledge of the specific underlying graphics processor. This allows programmers to write significantly less code.

Figure 3:
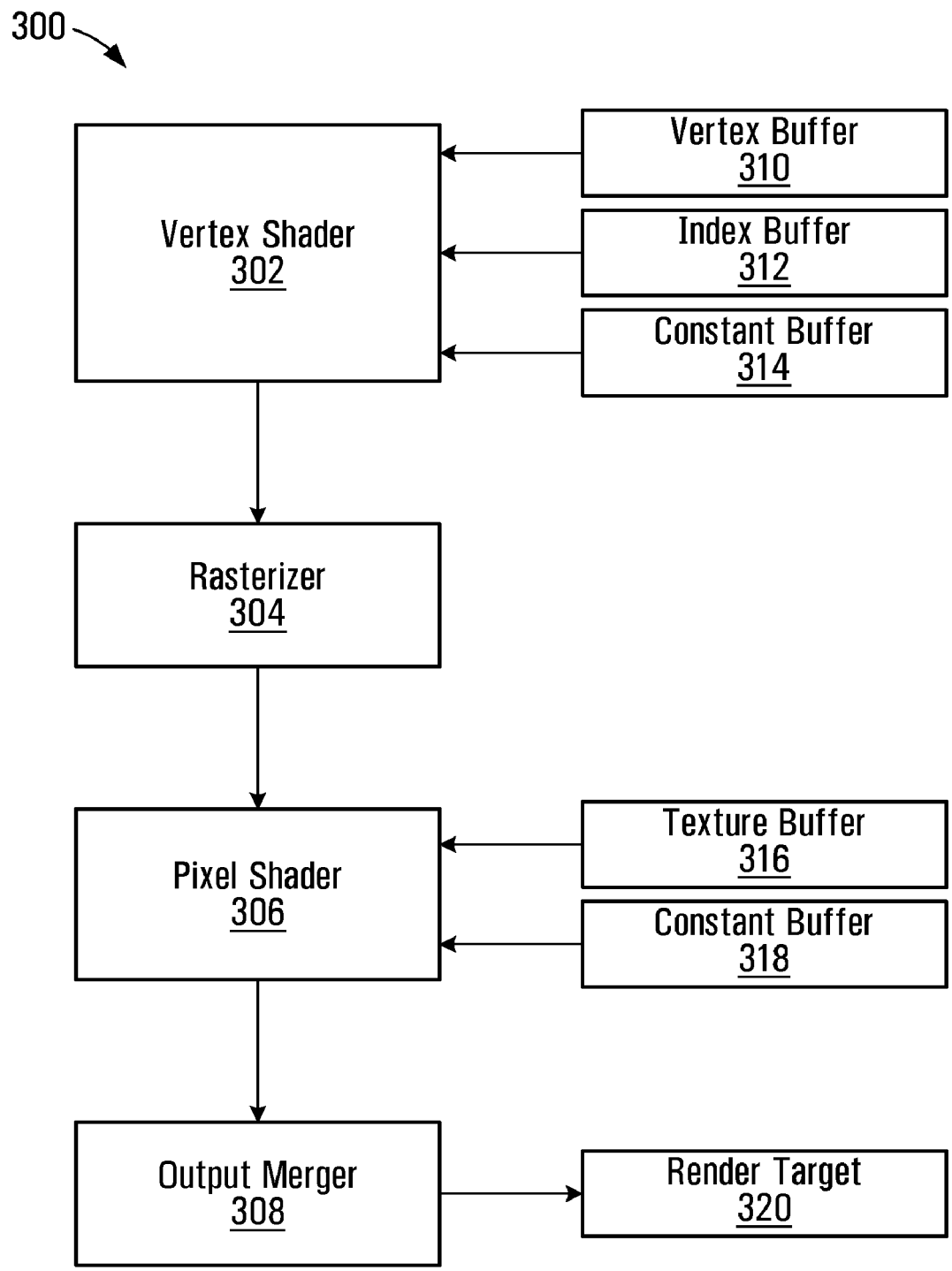
FIG. 3 is a simplified block diagram of one common graphics pipeline model representative of stages in the graphics processor of the computing device of FIG. 1.

Graphics processor hardware may be abstracted by a particular graphics pipeline model. Graphics APIs and associated runtime libraries are generally designed to take the abstraction into account. FIG. 3 depicts a simplified block diagram of one graphics pipeline model representative of graphics processor 114 in the computing device of FIG. 1.

As depicted a graphics pipeline 300 may include multiple stages including a vertex shader 302, a rasterizer 304, a pixel shader 306 and an output merger 308. Other embodiments of a graphics pipeline may also include input assembler, geometry shader, and stream output stages.

Various buffers formed in memory, which may be frame buffer memory, may be used to store indices and texture data and to transfer data between the different stages in the pipeline. Accordingly a vertex buffer 310, an index buffer 312 and constant buffer 314 may provide inputs to vertex shader 302. Texture buffer 316 and constant buffer 318 may be used to provide input to pixel shader 306. A render target buffer 320 may be used by output merger 308 to output rendered pixels. These buffers may be formed inside the same physical memory or may be formed in different blocks of memory accessible to graphics processor 114. In particular, vertex buffer 310, index buffer 312, and constant buffer 314 need not be adjacent in memory. Similarly texture buffer 316 and constant buffer 318 may not be adjacent in memory. The illustration is thus only exemplary. Individual buffers may reside in different parts of a memory block or may even be spread out across physically separate blocks of memory.

Pipeline 300 may be compliant any hardware architecture including but not limited to, known architectures such as shader model 2, shader model 3, shader model 4 or the like.

Buffer 316 may be used to store intermediate buffers when multiple passes through pipeline 300 may be required. Pixel shader 306 may store its output data into buffer 320 for re-use in a subsequent pass. This is often observed in conventional plane composition operations as detailed below.

Graphics applications such as video players, often take advantage of the abstraction provided by various stages in pipeline 300 to utilize graphics processor 114 for hardware acceleration. For example, video player applications for presenting video on a Blu-ray disc or an HD DVD disc must often deal with a multiple streams of video. Each stream may be used to form individual planes or layers that are composited to form the final frame for display. Individual planes may correspond to a background plane, a main video, sub-video (also called picture-in-picture), a subtitle plane, user interface plane, graphics planes, a cursor plane and the like.

Figure 4:
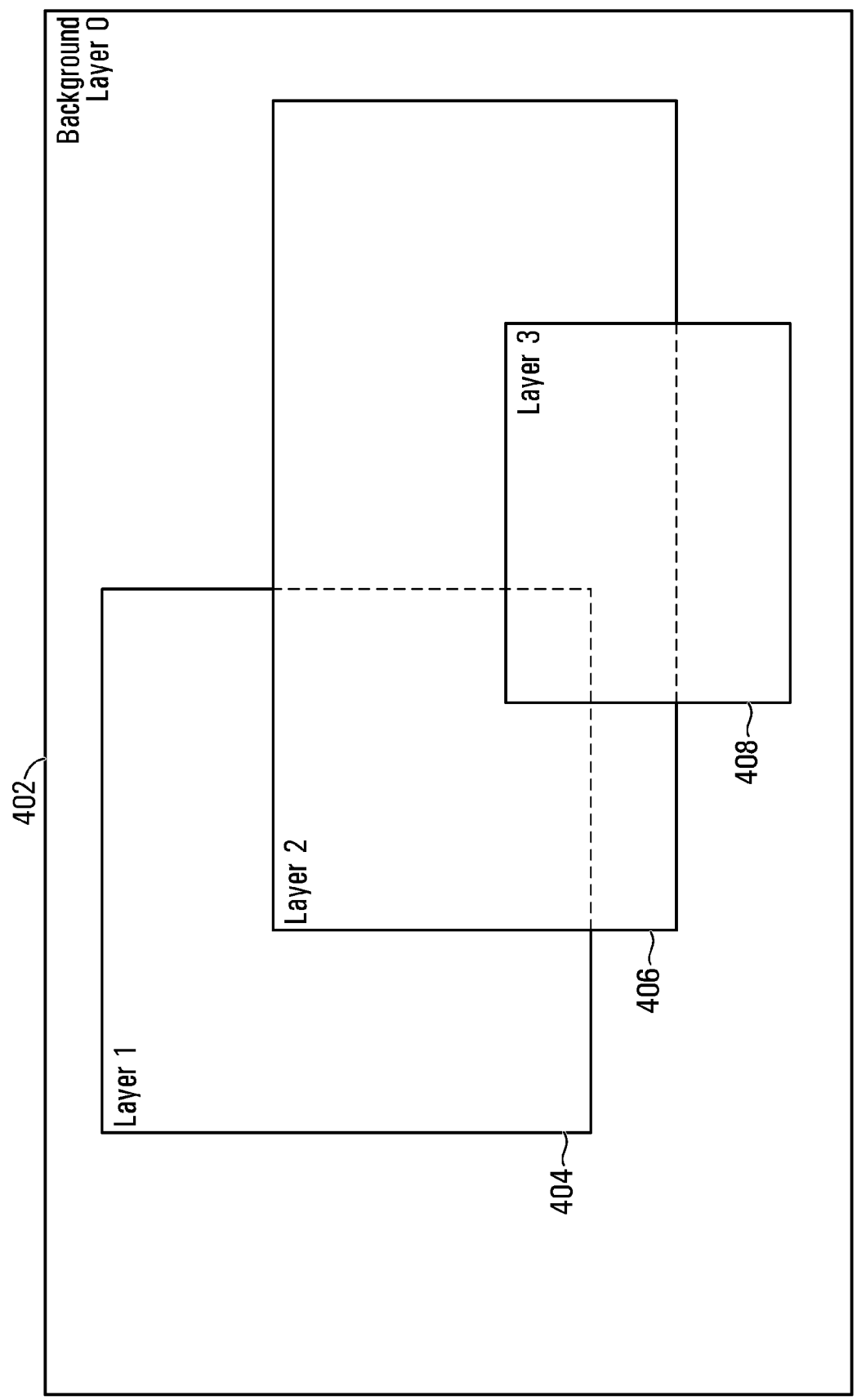
FIG. 4 depicts a block diagram of a number of source planes that are to be composited on top of one another to form an image for display on the display device of FIG. 1.

FIG. 4 depicts a block diagram of a number of planes that are layered on top of one another to form an image for display. Plane 402 is a background plane. The first higher plane is depicted as plane 404. The second higher plane is plane 404 which is on top of background plane 402 but underneath the third higher plane 406. Plane 408 is the topmost layer in the arrangement depicted in FIG. 4.

Each plane may have an associated transparency value which may be specified for the entire plane, or on a per pixel basis. For example, the RGBA or ARGB color format provides the red, green and blue sub-pixel values in R, G and B, as well as an alpha value A, which determines how transparent the pixel is. The alpha value may indicate the degree to which any background pixel is visible. An alpha value of 0 may indicate complete transparency while an alpha value 1 indicates complete opacity. The value may be scaled and specified as an 8-bit value by multiplying the value in the range 0-1 by 255 and rounding or truncating to the nearest integer. In alternative representations R, G and B may be pre-multiplied by their corresponding alpha value A.

Conventional video compositing by video player application 202 executing in a computing device such as device 102 typically involves calling appropriate graphics routines in graphics runtime 204 through its associated application programming interface. The graphics runtime 204 provides interfaces to conventional driver routines defined in driver 208 for graphics processor 114.

Figure 5:
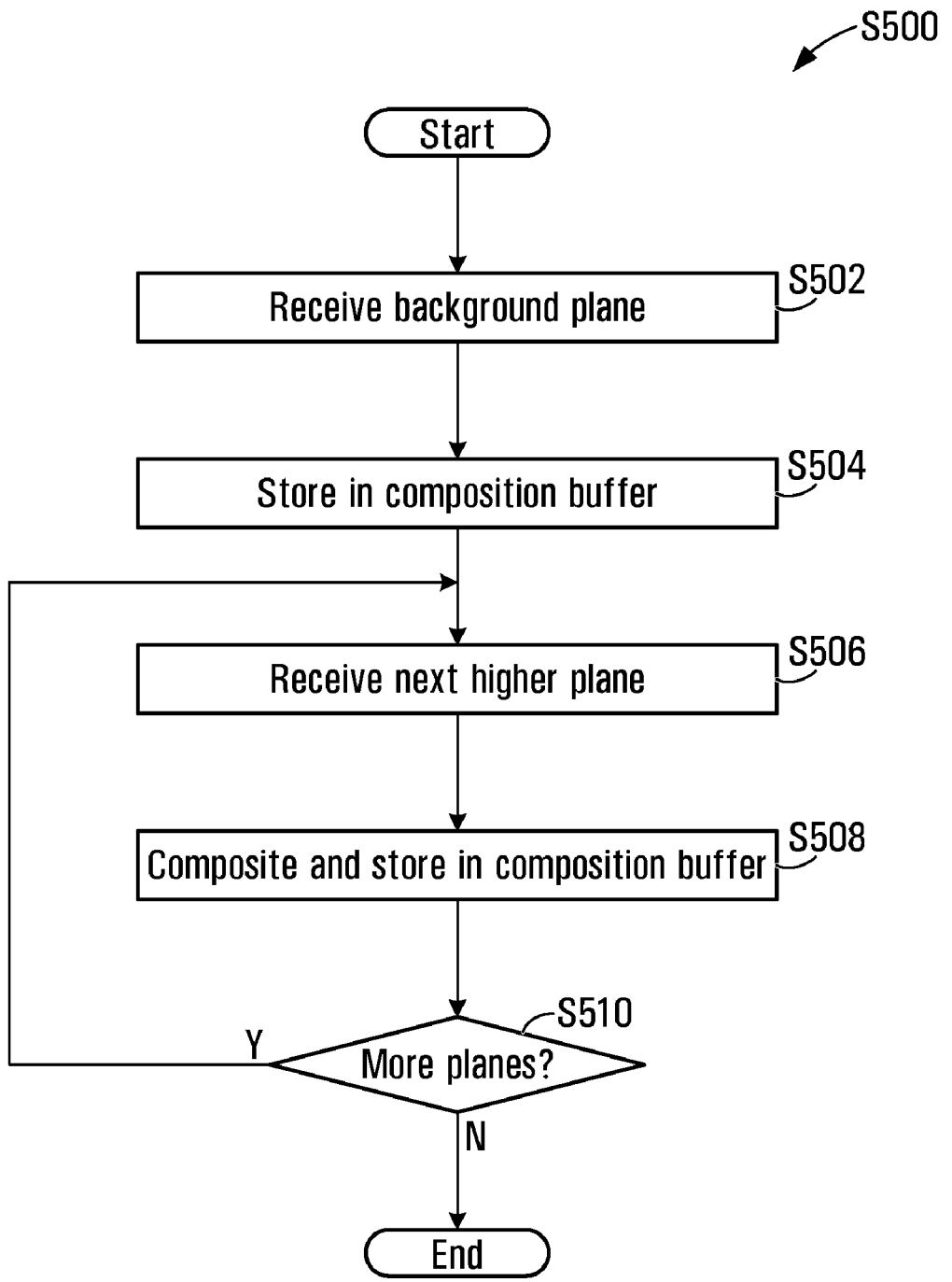
FIG. 5 depicts a flowchart for a conventional process for compositing the planes of FIG. 4 using the pipeline of FIG. 3.

Conventional video compositing requires multiple passes through a graphics pipeline such as pipeline 300. Conventional methods for compositing multiple planes typically composite the first two planes, to form an intermediate composited plane. The intermediate plane is then composited with another plane to form an updated intermediate plane. Each composition requires a pass through pipeline 300. Finally, the last plane is composted to the last updated intermediate plane to form the final composited image. Specifically, conventional plane composition of the planes depicted in FIG. 4 may initially start by compositing a background plane 402 (layer-0) and the next higher plane 404 (layer-1). Thus background plane 402 (layer-0) and the next plane 404 (layer-1) are provided to pipeline 300 as inputs, along with transparency values. This conventional process is illustrated in a flowchart S500 depicted in FIG. 5. Pipeline 300 initially accepts a background plane (S502) and stores it a composition buffer (S504). It then receives the next higher plane (S506) and forms and stores the intermediate composited plane in the same composition buffer (S508). If there are more planes to composite (S510), the next higher plane is received again (S506) and composited onto the intermediate frame in a subsequent pass through pipeline 300. The process terminates when there are no more planes left to composite (S510).

Alpha-blending may take place in the pixel shader and output merger stages of pipeline 300. In a first pass, plane 402 and plane 404 (i.e., layer-0 and layer-1) may be composited or alpha-blended to form an intermediate layer-X. The intermediate layer may be stored in an intermediate composition buffer in memory. As may be appreciated, significant memory size and bandwidth requirements may be imposed on the graphics processor 114 to store the intermediate composition buffer.

In a subsequent pass, the next higher layer (layer-2) may then be provided to pipeline 300 as input, to be blended with the intermediate layer-X already stored in buffer memory. The composition operation will form an updated intermediate image in the composition buffer containing contributions from layer-0, layer-1 and layer-2. This process may be repeated until the highest layer is blended onto the preceding layers to form a final rendered image or frame ready for display.

In the ARGB format, when a pixel $P_0=(A_0, R_0, G_0, B_0)$ from background plane 402 and another $P_1=(A_1, R_1, G_1, B_1)$ from foreground plane (e.g. plane 404) are composited, the corresponding an intermediate image pixel $P_x=(a_x, r_x, g_x, b_x)$ may be computed as follows. Note that $P_0, P_1, P_x$ reside at the same pixel location within the render target and $A_0, A_1$, and $a_x$ are each between 0 and 1.

Using the red component for illustration, in the initial pass through pipeline 300, the first intermediate pixel $r_1$ is computed as $r_1=(1-A_1) R_0+A_1 R_1$. On the second pass, the red component in the intermediate buffer is updated as $r_2=(1-A_2) r_1+A_2 R_2$. Thus after the $n^{th}$ pass, to composite n planes and the background, the intermediate buffer red component value may be given as $r_n=(1-A_n)r_{n-1}+A_n R_n$ where $r_{n-1}$ is the red component value in intermediate buffer value after the previous $(n-1)^{st}$ pass. The same holds for the green and blue components.

Many disadvantages can be identified with this conventional method of compositing planes. First, a large memory footprint is often required to store the intermediate planes formed from compositing a subset of the layers. This clearly requires a large video memory size.

In addition, large video memory bandwidth is required to ensure that all composition operations are finished before the next frame is displayed. This may mean that multiple passes (and associated memory read and write operations), through pipeline 300 must be completed within a frame period which may be $1/24^{th}$ of a second or less especially if further processing is required on the composited frame.

To overcome these disadvantages and simplify the programming model, exemplary embodiments of the present invention in the form of a new API, a graphics library and device driver software, for use in computing device 102 will be described below.

Figure 6:
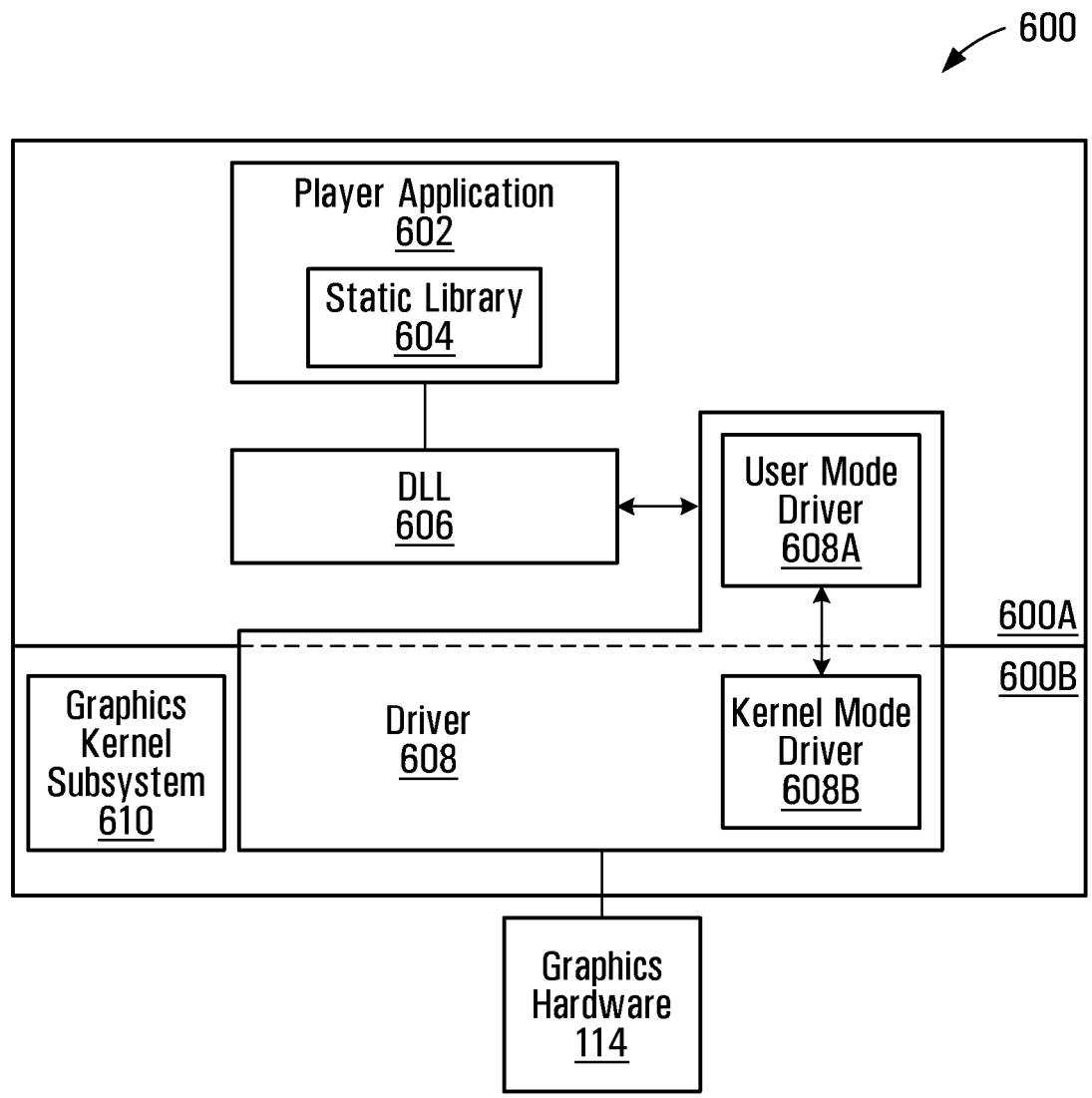
FIG. 6 is a simplified logical diagram of API/library and a device driver, executing cooperatively within the computing device of FIG. 1, in an exemplary embodiment of the present invention.

FIG. 6 depicts a simplified logical diagram of an operating system 600 interacting with an application software 602, a dynamically linked graphics library 606 and device driver 608, executing in a computing device such as device 102, in an exemplary embodiment of the present invention. Operating system 600 may be viewed as being made up of a user space 600A and kernel space 600B.

Application software 602 may be a video player application and may include a library 604 that is either statically or dynamically linked to the application. Application software 602 may interact with graphics processor 114 through an API defined in static library 604 which provides an interface to dynamically linked library 606, which in turn provides an interface to driver routines defined in device driver 608 and/or other kernel routines in a graphics kernel subsystem 610.

Device driver 608 may include a user mode driver 608A and a kernel mode driver 608B. As depicted, application software 602, static library 604, dynamic graphics library 606, and user mode driver 608A may operate in user space 600A of operating system 600. Conversely kernel mode driver 608B, graphics kernel subsystem 610 may operate in kernel space 600B of operating system 600.

Application software 602, dynamically linked graphics library 606 and device driver 608 may all be in the form of processor executable instructions or CPU instructions to be executed on processor 106. Accordingly, processor executable instructions in driver 608 may include kernel mode instructions (kernel mode driver 608B) as well as user mode instructions (user mode driver 608A). In addition, processor executable instructions in driver 608 may include driver code for execution by a CPU (e.g. processor 106), and graphics processor instructions (shader code) for execution by graphics processor 114.

Furthermore, in some embodiments, graphics processor 114 may form part of processor 106. Thus instructions in driver 608 may include graphics processing instructions (shader code) for execution on the same processor having graphics processing capability.

In operation, to achieve the plane composition as depicted in FIG. 4, exemplary application software 602 initializes dynamic library 606 and supplies the required plane data using the software interface or API specified in static library 604. Individual planes and associated data may be obtained, for example, by decoding a Blu-ray video stream, such as the main video, graphics stream or sub-video stream, using processor 106. The video stream from which individual planes are obtained may read from an optical disc (e.g., HD DVD or Blu-ray disc), hard-disk, or other digital storage media. Alternately, the video stream may be received by way of a network, a video cable, an optical cable and the like.

The exemplary API may specify or include data structures for encapsulating a collection of planes, in the form of memory addresses, linked lists, arrays, pointers, or other collection classes for representing planes. Other attributes such as position and size, plane type, source data buffers or buffer pointers, destination data buffers or pointers, and flags indicative of various attributes (e.g. full screen mode display), alpha values, color format, and the like, may be specified by the application using data structures defined in static library 604.

Application software 602 may populate data structures with a list of planes for composition. These data structures may take the form of an array, a linked list, a collection class or similar representation in memory. Each plane may have its own color format—that is, a plane may be specified in one of RGB, ARGB, YCbCr (sometimes called YUV) 4:2:0, YCbCr 4:2:2 formats and the like.

After receiving a list of planes to be composited from application software 602, dynamic library 606 provides the plane data specified by application software 602 to device driver 608. To do so, dynamic library 606 may use a number of methods including the use of a defined surface format. The surface format may be a 4CC surface, identified by a unique four character code. Alternately, an extension of an existing API may be used to selectively tag a surface, so that driver 608 can distinguish calls from library 606 for passing planes, from other calls that do not originate in library 606. Other methods include the use of a de-interlacing and sub-stream compositing call (e.g. VideoProcessBlt( ) for Windows Vista) with a private globally unique identifier (GUID); passing compressed buffer of planes to a DirectX Video Acceleration (DXVA) defined decoding routine with a private GUID; or using version 2 of the DXVA interface (called DXVA2) when the operating system is Widows Vista™. As will be appreciated by those skilled in the art, DXVA and DXVA2 are standard software application programming interfaces including corresponding driver interfaces, for using hardware-acceleration to speed up video processing using a graphics processor. However, DXVA2 differs from DXVA as it includes standalone APIs for decoding, processing, and capturing video.

Conveniently, dynamic library 606 shields an application programmer from details of how plane data is actually passed to driver 608 for composition—or the subsequent partitioning, described below. After device driver 608 receives data representative of planes to be composited, it may partition or divide the target surface into distinct partitions each of which may be provided to pipeline 300 to be composited individually.

Figure 7:
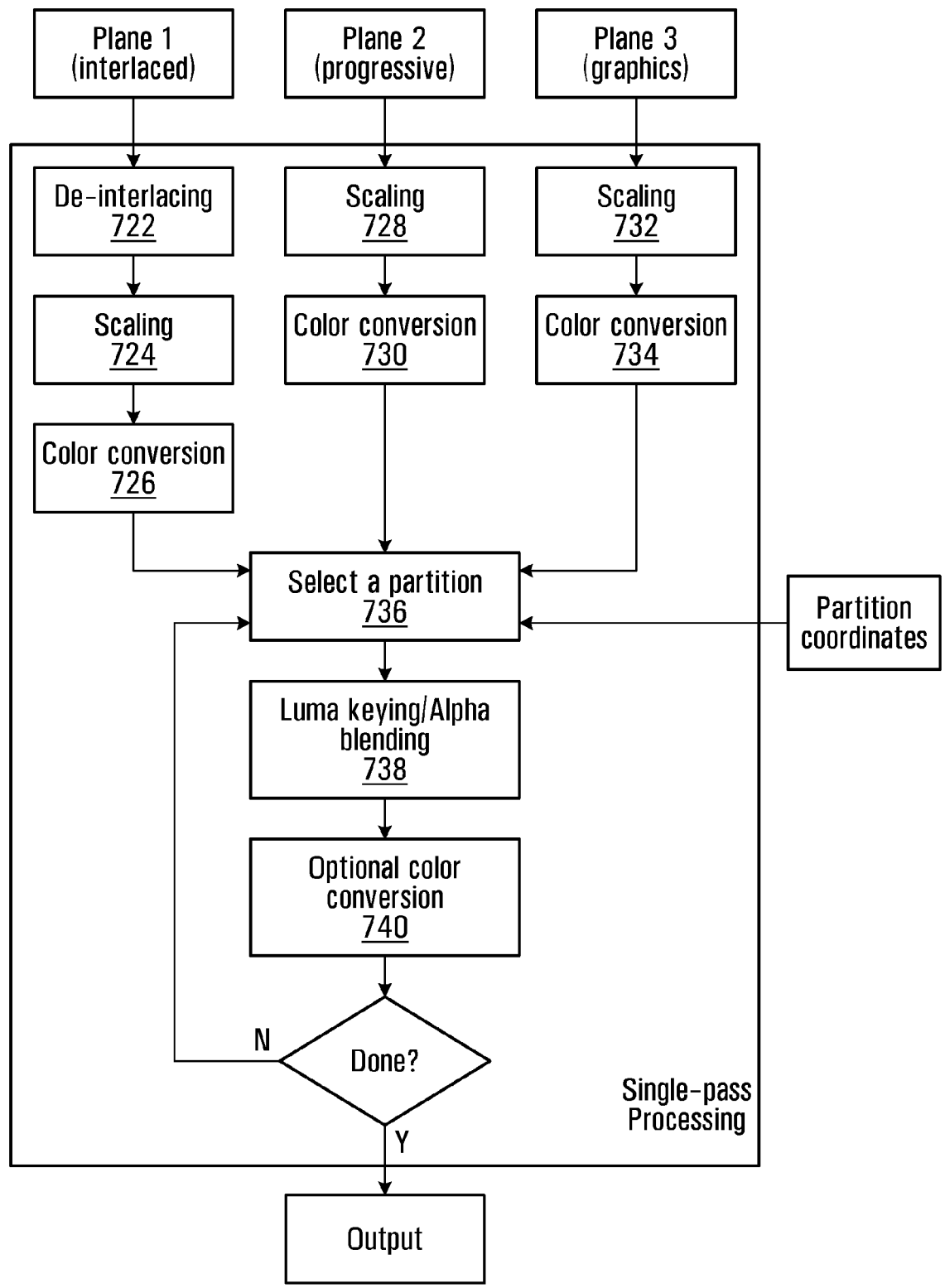
FIG. 7 is a flowchart of logical steps performed by an exemplary device to composite multiple planes to form a final image.

The overall operation is outlined in a flowchart depicted in FIG. 7. In the depicted example, three planes are provided to a graphics pipeline for composition in a single pass. Each plane may require different types of processing steps. For example, for an interlaced plane (e.g., Plane 1 in FIG. 7) a de-interlacing step 722 may be required. A scaling step 724 and a color conversion step 726 may also be required for the interlaced plane. A progressive plane (Plane 2 in FIG. 7) however, does not require a de-interlacing step, but may require a scaling step 728 and a color conversion step 730. Similarly a graphics plane input (Plane 3 in FIG. 7) may similarly only require scaling step 732 and a color conversion step 734). The color conversion steps (726, 730, 734) may convert pixels from one color space (e.g., YCbCr) to another color space (e.g., RGB). After all input planes to be composited are appropriately scaled and color converted to a common format, the target surface may be divided into partitions using methods that will be detailed below. Once the target surface is divided into partitions, each partition may be selected (step 736) using its coordinates, and luma keying/alpha-blending (step 738) may be performed on the selected partition. Optional color conversion (step 740) may be performed if needed. The composited partition is then provided as output. This may be repeated for all partitions, to form and output the final image.

Figure 8:
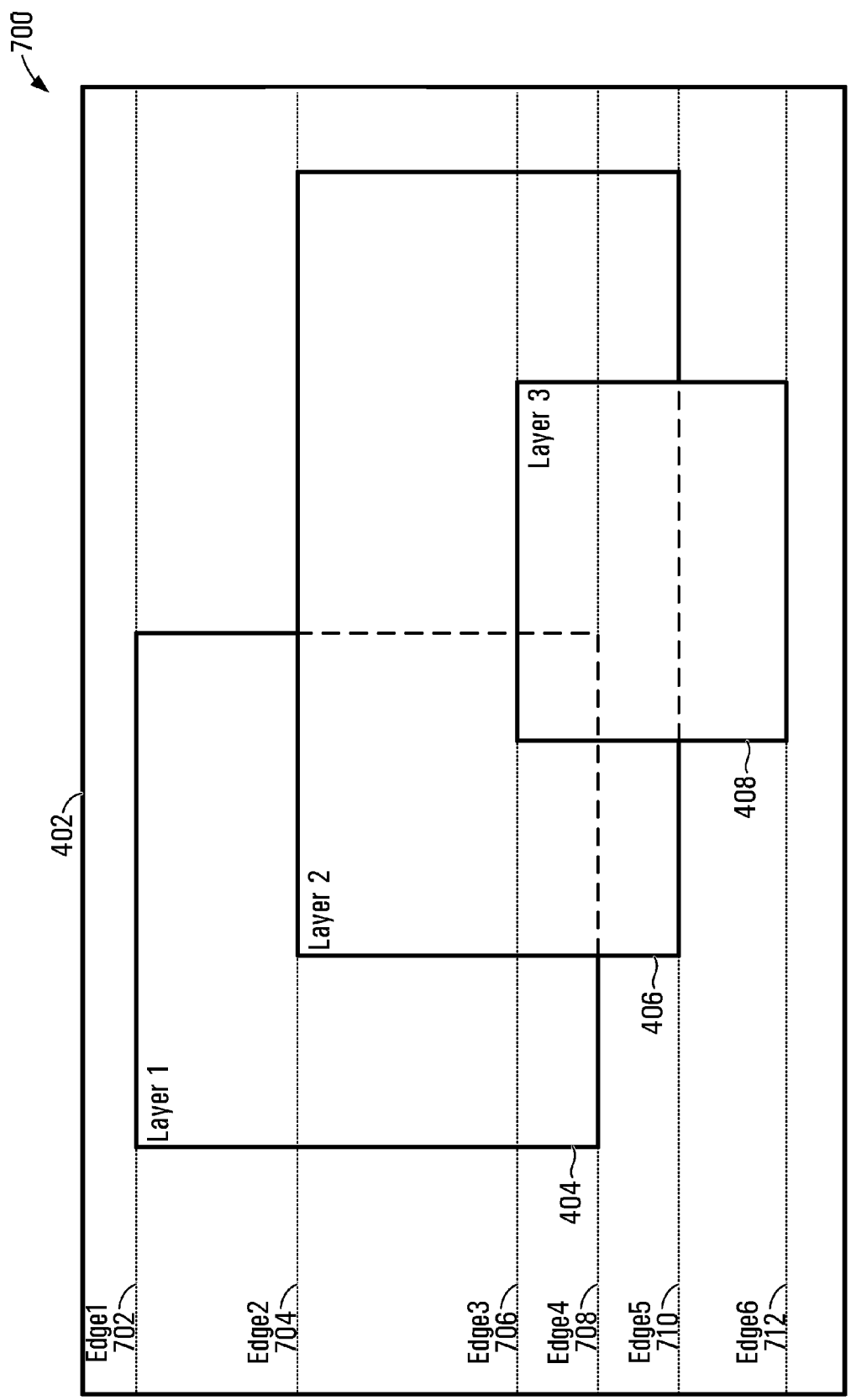
FIG. 8 is a logical diagram of an exemplary partitioning of a target surface on which the planes of FIG. 4 are composited.

In one specific exemplary embodiment depicted in FIG. 8, driver 608 divides surface 700, which may overlap or be coextensive with background plane 402. Each plane may be specified using a common coordinate system so that all planes have a common reference coordinate system. The common coordinate system may be the window coordinate system of surface 700. However, in other embodiments the screen coordinate system may be used. Accordingly, each plane's coordinates define the boarders and placement of the plane on a target surface.

Driver 608 may initially identify the top and bottom boundaries of each plane, and form corresponding horizontal edges or lines spanning the width of the surface 700 as depicted. Each horizontal edge corresponds to either the top or bottom boundary of a plane. In other words, each horizontal line along which the top or the bottom of any plane may lie may be designated or marked as a horizontal edge by driver 608. For example, as depicted in FIG. 8 a horizontal edge 702 marks the top boundary of plane 404. Another horizontal edge 704 marks the top boundary of plane 406. Horizontal edge 706 marks the top boundary of plane 408 while horizontal edge 708 marks the bottom boundary of plane 404. Horizontal edge 710 marks the bottom boundary of plane 406. Horizontal edge 712 marks the bottom boundary of plane 408.

The horizontal edges thus divide surface 700 into multiple horizontal strips as shown. As may be appreciated, the edges may be easily computed from the corner coordinates of each plane.

Subsequently, driver 608 may form vertical edges that correspond to vertical boundaries of each plane. The horizontal strips formed above, may thus be subdivided along the vertical edges so formed, to define the partitions depicted in FIG. 9.

As may be appreciated, the use of horizontal and vertical edges as depicted (FIG. 8), allows device driver 608 to form partitions as contiguous regions of connected pixels that would be composited from the same subset of source planes. The partitioning operation depicted in FIG. 8 results in a number of regions or partitions. A partition is a set of connected pixels, in which each pixel is to be composited from corresponding pixels of the same subset of planes. A given pixel at location (x,y) is said to be connected (or specifically 8-connected) to its eight neighboring pixels at locations (x−1, y−1), (x−1,y), (x−1,y+1), (x,y−1), (x,y+1), (x+1,y−1), (x+1, y) and (x+1,y+1). A pixel P is thus connected to another pixel Q, if P is 8-connected to Q or if there is a path (of interconnected pixels) from P and Q on which each pixel is 8-connected to the next pixel. For the purposes of the present disclosure, two pixels may be considered to be connected, if they are 8-connected.

A partition is thus a set of connected pixels sharing a common identical subset of planes from which each pixel is to be composited. At least two pixels are contained in each partition, and every pixel is connected (e.g., 8-connected) to at least one other neighboring pixel within the partition.

Unlike conventional edge-based image segmentation techniques, no image analysis or edge detection step is required to form partitions in embodiments of the present invention. In the exemplary embodiment depicted in FIG. 8, the edges used to form partitions simply correspond to boundaries each plane to be composited. Using horizontal and vertical edges corresponding to the boundaries of planes to be composited, a surface such as surface 700 may be divided into multiple such partitions.

In alternate embodiments, to identify partition boundaries, the first plane may be overlaid on top of the background plane and the region of intersection may be identified as a partition. Subsequently, the next plane may be overlaid on top of existing partitions to further identify new regions of intersections to form new partitions. This process may be repeated until all planes are overlaid and all partitions are identified.

Figure 9:
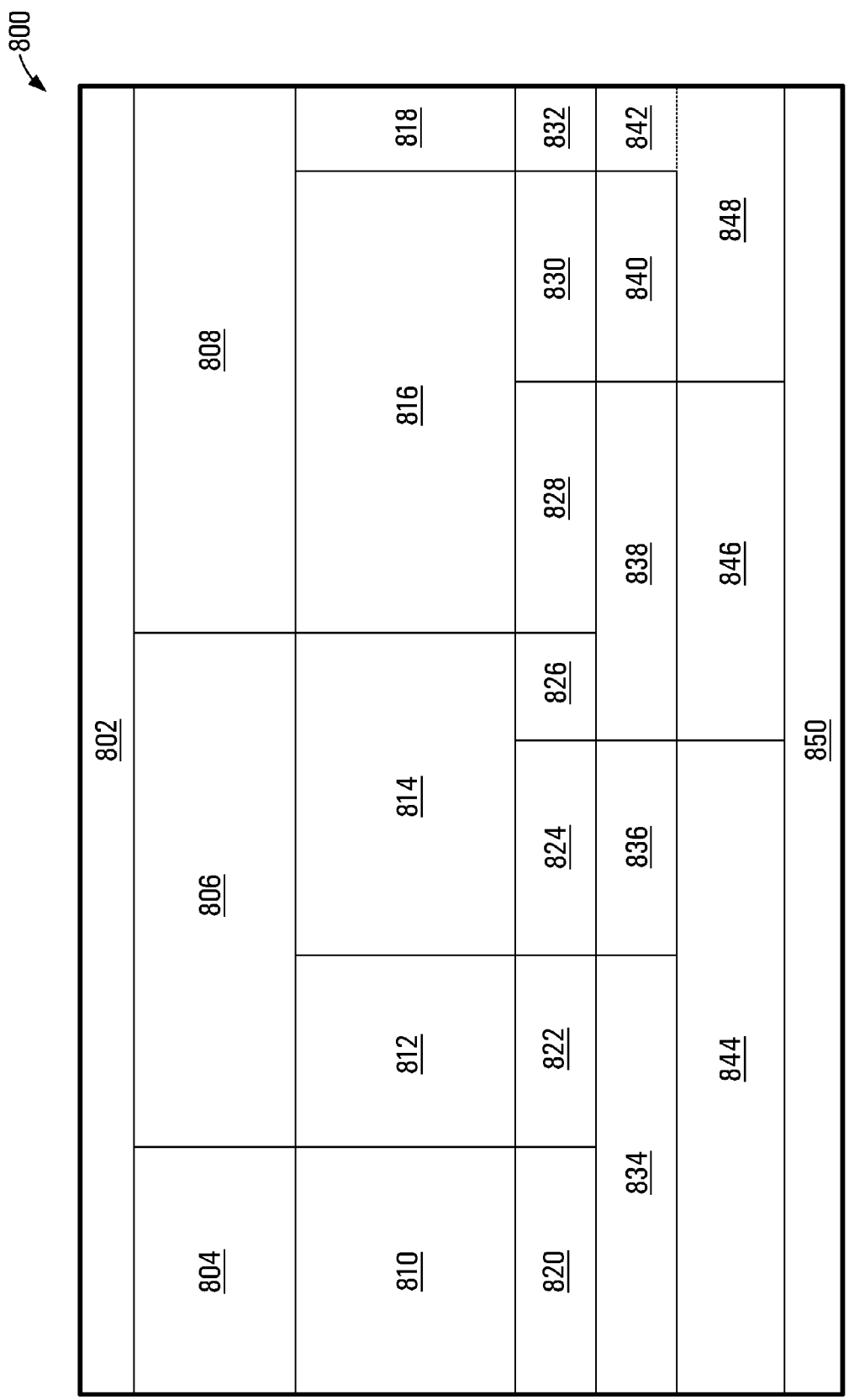
FIG. 9 is a simplified logical representation of exemplary rectangular partitions resulting from the partitioning depicted in FIG. 8.

FIG. 9 depicts one exemplary division of a surface using the horizontal and vertical edges depicted in FIG. 8. The partitions include partitions 802, 804, 808, 810, 812, 814, 816, 818, 820, 822, 824, 826, 828, 830, 832, 834, 836, 838, 840, 842, 844, 846, 848 and 850. For each of the partitions, driver 608 associates an identifier of the subset of planes to be composited. Driver 608 may also indicate the order of composition.

Driver 608 divides a target surface so as to form a complete partition—that is, a target surface such as surface 800 depicted in FIG. 9, is tessellated so that when the partitions are assembled back together, they would completely fill the target surface without gaps or overlaps. In other words, generally if a target surface is divided into N partitions denoted $p_1, p_2, \ldots p_N$ each partition being a set of connected pixels; then the intersection of any two partitions $p_i, p_j$ is the empty set (i.e., $p_i \cap p_j = \emptyset$ for $1 \leq i \leq N$ and $1 \leq j \leq N$ and $i \neq j$) while the union of all partitions forms the original target surface.

Each partition's coordinates along with an identifier of its corresponding subset of planes, may be provided to pipeline 300 of graphics processor 114 for composition. As will be appreciated, the size and position of any rectangular partition may be completely specified by its coordinates relative to the coordinate system of the target surface (e.g. window coordinates).

Different subsets of the planes to be composited may be associated with different partitions. For example, partition 802 is associated with only background plane 402, while for partition 826 the corresponding subset of planes includes planes 402, 404, 406 and 408. That is, pixels of the final image in partition 802, are simply corresponding pixels in plane 402 while pixels in partition 826 are composited from corresponding pixels in planes 402, 404, 406 and 408.

Although the depicted partitions are rectangular in shape, in alternate embodiments the partitions may take on other shapes. Partitions may, for example, be formed in the shape of other polygons such as triangles, squares, or other combinations of shapes that may result from regular, semi-regular or other tessellation techniques. For example partitions may have shapes formed from one or more triangles.

As may be appreciated pixels of a given plane may be specified in the RGB, YCbCr or another color format along with transparency values. Per pixel transparency (alpha) values may be used to specify planes having non-rectangular shapes (e.g., ARGB color format). A pixel may thus be designated as invisible, by setting its corresponding per pixel alpha value to indicate complete transparency. Invisible pixels of a plane may however still be considered part of the plane for the purposes of forming horizontal and vertical edges in the partitioning described above.

Figure 10:
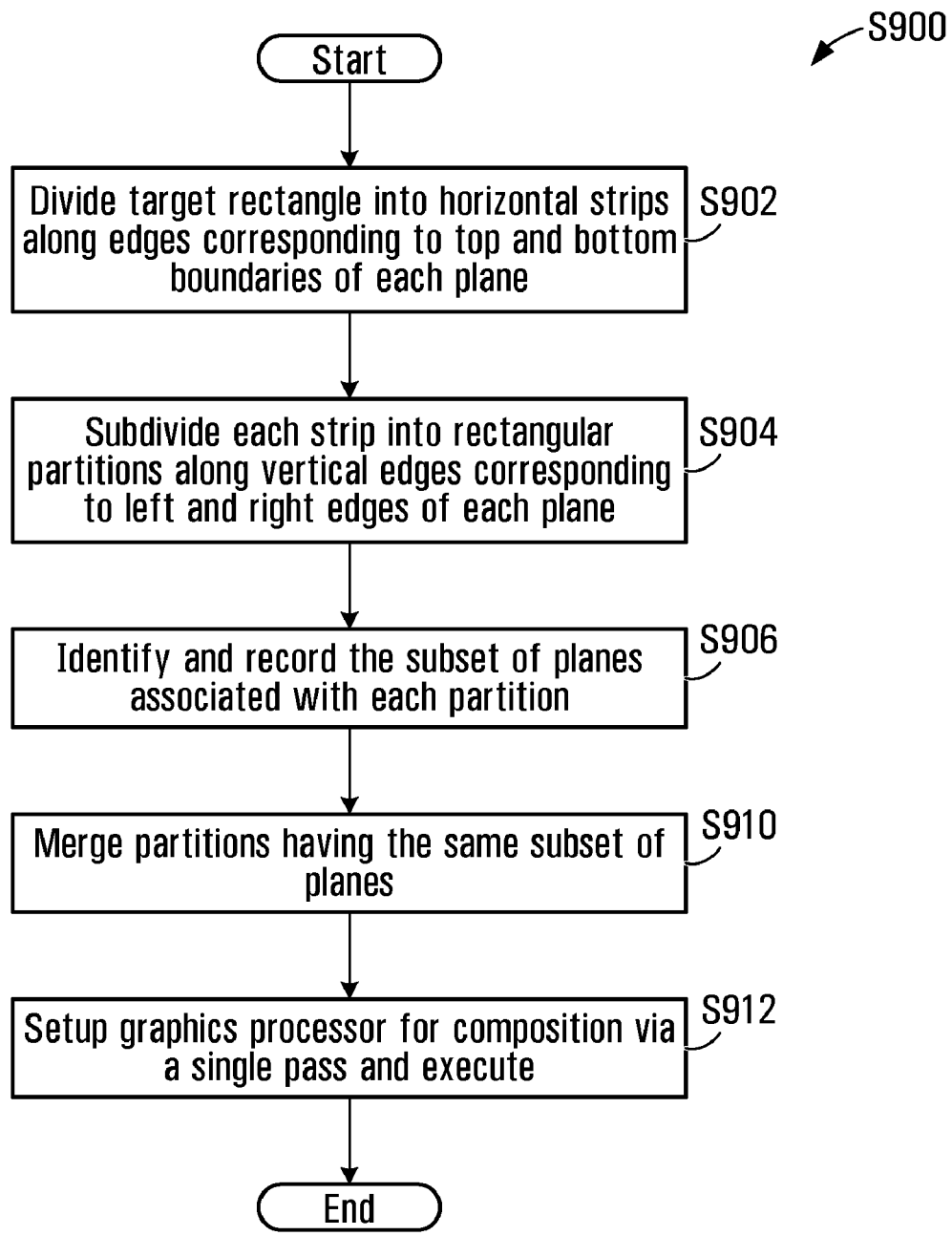
FIG. 10 is a flowchart of steps performed by an exemplary device driver to form the rectangular partitions of FIG. 9.

FIG. 10 is a flowchart that summarizes partitioning steps (S900) taken by device driver 608. Initially (S902) a target surface is divided into horizontal strips along horizontal edges that span the width of the target surface. Each horizontal edge corresponds to an individual top and bottom boundary of at least one plane or layer. As noted above, each plane may have screen coordinates with respect to which it is to be overlaid onto a surface. Accordingly, some areas of the surface may be covered by one plane, while others may be covered by multiple planes.

After horizontal strips are formed, each strip is subdivided (S904) into rectangular partitions vertically along the left and right boundaries of each plane within the strip. The partitioning algorithm or logic in driver 608 may then identify and record (S906) the layers or subset of planes associated with each partition. For the exemplary partitioning depicted FIG. 9, the corresponding planes or layers that are associated with each partition are given in a table depicted in FIG. 11.

Each partition may be associated with a corresponding subset of planes that may be composited to from a portion of the image corresponding to the partition. To reduce the number of such partitions, partitions with identical associated subset of planes may be merged into a single larger partition. The resulting larger partition would still be a set of connected pixels to be composited from the same subset of planes. Thus, optionally driver 608 may merge partitions that have the same layer stack or associated subset of planes (S910). Partitions that may be merged together may be adjacent. As a specific example, partitions 812 and 822 in FIG. 9 may be merged into a single partition as they have an identical subset of associated planes.

Finally graphics processor 114 may be provided with the partition data (i.e., coordinates of the partition and identifier of the subset of planes) to graphics processor 114 which may composite the final image a single pass (S912) through its pipeline 300. The shaders in pipeline 300 may form the final image in a frame buffer in a single pass, without first storing intermediate images to be composited with each one of the individual planes. Each formation of an intermediate image in a conventional composition scheme requires a pass through graphics pipeline 300. Accordingly, multiple passes would have been required in conventional uses of a graphics pipeline for digital image composition. However, exemplary embodiments of the present invention require only one pass. In other words, each partition may be processed using a single shader code to output its corresponding final pixels in the final image. That is, intermediate pixel values need not be stored for later processing. Shader code may be executed for one partition after another sequentially. However, in embodiments containing multiple shader execution units, multiple shader codes may be executed in parallel.

Planes to be composited may include a background plane (e.g. plane 402), a first plane (e.g. plane 404), a second plane (e.g. plane 406) and potentially many more planes (like plane 408). As noted above, exemplary methods for compositing planes onto a target surface involve identifying contiguous regions of connected pixels to be composited from the same subset of planes. The partitions so formed may include at least one partition (e.g., partition 814) within an area of the target surface covered by both the first and second planes; a second partition (e.g., partition 812) within another area of the surface covered by the first plane but outside of the second plane; and a third partition (e.g. partition 816) within yet another area of the surface covered by the second plane but outside the first plane. Each one of the partitions is then associated a corresponding subset of planes that are composited to form the partition. A given partition and its associated plane regions actually used during composition would have the same coordinates (or size and position) on the target surface.

For each partition, graphics processor 114 may be provided with partition coordinates and an identifier of the associated subset of planes to be composited. Graphics processor 114 may also be provided with the order of composition for the subset of planes. The identifier for the associated subset of planes and their order of composition may be provided in the form of memory or buffer addresses, pointers, arrays, linked lists, or buffer identifiers and the like, indicating memory locations storing pixels of each plane in the subset of planes to be composited. As will be appreciated by those of ordinary skill in the art, the order of planes may be easily communicated to graphic processor 114. For example, memory addresses corresponding to planes associated with a given partition, may be specified in their order of composition—starting with the bottom plane and ending with the top plane, or vice versa. Similarly, linked lists, arrays, or other structures used to transfer individual planes as inputs to processor 114 may be ordered or arranged to conform to the order of plane composition.

Graphics processor 114 may then composite image pixels for each of the partitions from corresponding pixels of the associated subset of planes to render an image on the target surface. The image on the target surface may be formed by a single composition pass through the graphics pipeline, as each partition has corresponding plane regions for its composition, which may all be supplied to of graphics processor 114.

In another alternate exemplary embodiment, the order of edge formation may be reversed for the partitioning operation. That is, partitioning logic in driver 608 may first divide the target surface into vertical strips, by finding vertical edges spanning the height of the target surface, along which the left or right boundaries of each plane may lie. Subsequently, each vertical strip may be subdivided into rectangular partitions along horizontal boundaries corresponding to the top and bottom boundaries of each plane. Optional merging of adjacent partitions having the same subset of planes may also be performed.

In some embodiments, certain partitions may include transparent layers. As transparent layers do not affect the final pixel color of the image corresponding to a partition, they may be removed from the list of planes for compositing, associated with a given partition. As an optimization step, among the subset of planes associated with a given partition, those that are behind (or underneath or blocked by) an opaque plane may be removed from the subset of planes without processing. As can be appreciated, any pixel that is behind an opaque (completely non-transparent) pixel would not contribute to the final image.

In some applications, a clear rectangle may be specified, and pixels of one or more of the planes to be composited that lie within the clear rectangle may be made transparent to expose a particular plane of choice. For example, in HD DVD applications, a clear rectangle may be defined to expose the main video plane. To expose the main video plane, pixels of all other planes in front the main video plane that lie within the clear rectangle are made transparent. An HD DVD video player application may specify which particular plane the clear rectangle exposes. Typically the clear rectangle is used to make either a main video or a sub-video plane visible in the foreground. As may be appreciated, clear rectangle processing may be included in the plane composition logic, in exemplary embodiments of the present invention.

In addition to alpha-blending, shaders may also be used to perform luma keying. In luma keying, a pair of minimum and maximum luma values are used to determine the transparency of a pixel. For example, the alpha value may be set to a value of 0.0 if the pixel luminance value (i.e., Y in the YCbCr color space) is either greater than the maximum or smaller than the minimum value. Conversely the alpha value may be set to 1.0 if the pixel luminance value is in between the minimum and the maximum values. In other words, pixel values above a given maximum (or below a given minimum) value may be made transparent during compositing.

Conveniently, the partitions may be grouped by their shader setup requirements prior to being transferred or provided to a graphics processing unit such graphics processor 114. This allows a graphics processor to process a group of partitions that require a common shader type, before switching to another type of shader, which may improve efficiency. Techniques for proper selection and programming of shaders in pipeline 300 to accomplish the composition would be known to those of ordinary skill in the art.

Generally performance improvements may be realized by rearranging the partitions to match the specific hardware architecture employed by the graphics processor used. For instance, partitions that are to be composited from the same subset of planes may be grouped together for processing using the same shader code. The same shader code may be used to composite partitions that are grouped together. Partitions that are grouped together need not be adjacent to each other in order be grouped together. Nonadjacent partitions may be grouped together for processing using the same shader code, if they are to be composited from an identical subset of planes. Partitions that are grouped together may be processed sequentially after one another to avoid shader code switching.

To further reduce shader code switching, in some embodiments, smaller partitions to be composited from different subsets of planes but having at least one plane in common, may also be grouped together for processing. For example, a first partition to be composited from two planes (e.g., plane-1 and plane-2) may be grouped together with a second partition to be composited from the same two planes, as well as a third (e.g., from plane-1, plane-2 and plane-3). The first and second partitions, which are grouped together, may be processed immediately before or after one another. This permits a shader to composite the two partitions without switching shader code, but at the cost of a small pre-processing overhead. Pre-processing may be required to discard a small number of unused pixels from planes that are not common to all partitions that are grouped together (e.g. the third plane). That is, pixels from plane-3 corresponding to the first partition may be read but are discarded without being used. This helps to reduce the overhead involved in shader code switching.

The software interface or API specified in static library 604 may be used to provide data to driver 608. A software component such as application software 602 may provide data using the interface in library 604 to another software component such as driver 608, so as to allow a final image to be formed in a single pass through pipeline 300. Data provided to driver 608 may include video plane data, de-interlacing method (e.g. BOB de-interlacing), scaling factors (from video source to a window on screen), color conversion requirements (e.g. format of source planes and the destination color format) and luma keying related data. The software interface allows communication of all required data to form the final image from individual planes, so that a single pass is sufficient for graphics processor 114 to render the final image. In other words, the software interface in library 604 permits provision of all data required to render the final image in a single pass, without the need to store an intermediate image and retrieving additional data from application software 602 in subsequent passes.

Figure 12:
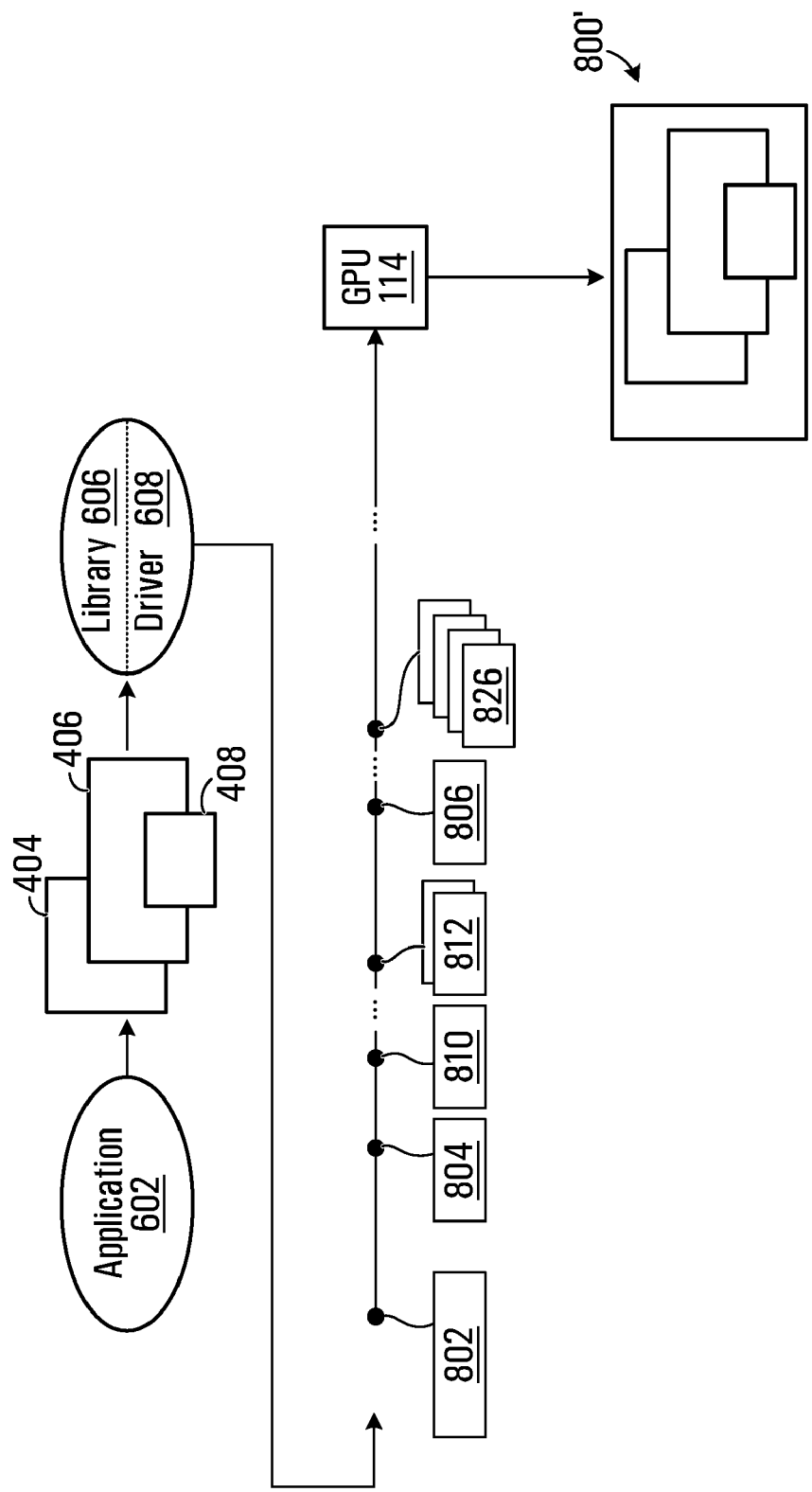
FIG. 12 is logical diagram of data structures used to composite the planes of FIG. 4 to form a final rendered image using exemplary embodiments of the present invention.

FIG. 12 depicts a logical diagram of example data structures involved in processing source planes 420, 404, 406, 408 to arrive at a final rendered image 800'. As can be seen application software 602 provides planes for composition and rendering, to library 606 and driver 608, which form partitions (e.g. partition 802, 804, 806, 826) with varying stacks of plane regions (or equivalently coordinates and an identifier of associated planes), and provide them to graphics processor 114 which may render final target image 800' them in a single pass.

Each partition may have its own graphics processor instructions or shader code that may be specified using a suitable shader language (e.g. shader assembly, HLSL and GLSL) and compiled for execution on graphics processor 114.

As noted above, each of source planes 402, 404, 406, 408 may be associated with a layer in a Blu-ray disc or HD DVD disc. Planes 402, 404, 406, 408 may also be decoded from a disc such as DVD, VCD, Blu-ray disc or HD DVD disc. Alternately source planes 402, 404, 406, 408 may be received from a broadcast source via digital TV, Internet TV, satellite receiver, set-top box and the like. For example, when decoding a Blu-ray disc, plane 402 may correspond to a background plane, while plane 404 may correspond to the main video plane. Planes 406, 408 may correspond to java plane, graphics plane, sub-video (PiP) plane, user interface plane, subtitle plane or the like. In some embodiments all the planes may be present. The format of the planes may also be different for embodiments of the present invention. For example, a main video plane may be specified in the YCbCr (sometimes called YUV) 4:2:2 format for Blu-ray sources while the background plane 402 may be provided in RGB format.

FIG. 13 depicts a table specifying formats which may be supported in one specific embodiment of the present invention. In addition, each plane or layer may be provided with a transparency value (alpha value) either globally or on a per pixel basis as shown. Moreover, different frame sizes and frame rates may be supported by each layer. For example, as depicted in FIG. 13, the main video, subtitle and background streams or planes may be encoded at high definition (HD) resolutions. It should be noted however, that many more formats, resolutions and combinations, may be supported by other embodiments of the present invention. The depicted color formats, resolutions and layers are thus only exemplary.

Color formats of all planes may be converted to the same format such as the ARGB format prior to compositing. Shader code for compositing planes may also perform color format conversion to a common format for composition. The common color format to which all planes may be converted for composition need not be the ARGB format—other formats may also be used in alternate embodiments.

Embodiments of the present invention may include a computer readable medium such as a compact disc (CD), hard disk or the like, on which processor executable instructions (i.e., CPU instructions) representing static library 604, dynamically linked graphics library 606 and device driver 608 including shader code are stored. For example, driver software package containing static library 604, dynamically linked graphics library 606 and device driver 608 including related graphics processor instructions may be distributed as a CD or DVD. Such software packages may also be downloaded onto a hard disk, a removable disk, or similar computer readable media on a computing device, from a server by way of a network connection.

Embodiments of the present invention may also include a computing device such as device 102, having processor executable instructions or CPU instructions representative of static library 604, dynamically linked graphics library 606 and device driver 608 including shader code are stored in a computer readable medium such as its memory 108, its hard disk or the like.

As noted above, in alternate embodiments, processor 106 may have graphics processing capabilities obviating a separate graphics processor such as graphics processor 114. Processor executable instructions executing on a processor having graphics processing capabilities, thus need not be separated into static libraries, dynamic libraries, driver code and shader code.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A processor-implemented method of compositing a plurality of planes comprising at least a first plane and a second plane onto a target surface, said method comprising, at least one processor:
    i) dividing said surface into strips, each of said strips bounded by a first set of edges corresponding to a first set of boundaries of each of said plurality of planes;
    ii) dividing said strips into partitions by subdividing each of said strips along a second set of edges corresponding to a second set of boundaries of each of said plurality of planes, each partition made up of connected pixels to be composited from the same subset of said plurality of planes associated with said each partition; said partitions comprising at least a first partition to be composited from at least both said first and second planes; a second partition to be composited from at least said first plane but not said second plane; and a third partition to be composited from at least said second plane but not said first plane;
    iii) merging those adjacent partitions that have identical associated subsets of said plurality of planes;
    iv) compositing pixels for each of said partitions from corresponding pixels of said associated subset of planes to render an image on said target surface.

2. The method of claim 1, further comprising providing said processor with partition coordinates and an identifier of said associated subset of planes for each of said partitions after said dividing.

3. The method of claim 2, wherein said plurality of planes is composited in a single pass by said processor.

4. The method of claim 1, comprising providing processor instructions to said processor for execution for said dividing and said compositing pixels for each of said partitions.

5. The method of claim 1, wherein said surface and each of said partitions are in the shape of one of: a triangle, a rectangle and another shape formed from at least two triangles.

6. The method of claim 5, wherein
    each of said first set of edges corresponds to top and bottom boundaries of said each of said plurality of planes and each of said second set of edges corresponds to left and right boundaries of each of said plurality of planes.

7. The method of claim 5, wherein
    each of said first set of edges corresponds to left and right boundaries of each of said plurality of planes and each of said second set of edges corresponds to top and bottom boundaries of each of said plurality of planes.

8. The method of claim 3, wherein at least two of said partitions are to be composited from at least one common plane, and said at least two of said partitions are composited immediately after one another by said processor.

9. The method of claim 8, wherein at least two of said partitions are to be composited from a first subset of said plurality of planes, and wherein said at least two of said partitions are both composited from said first subset of said plurality of planes immediately after one another by said processor.

10. A non-transitory computer readable medium storing processor executable instructions for forming an image on a surface by compositing a plurality of planes, said instructions comprising:
    i) instructions for dividing said surface into strips, each of said strips bounded by a first set of edges corresponding to a first set of boundaries of each of said plurality of planes;
    ii) instructions for dividing said strips into partitions by subdividing each of said strips along a second set of edges corresponding to a second set of boundaries of each of said plurality of planes, each partition made up of connected pixels to be composited from the same subset of said plurality of planes associated with said each partition, said partitions comprising at least a first partition to be composited from at least both said first and second planes, a second partition to be composited from at least said first plane but not said second plane, and a third partition to be composited from at least said second plane but not said first plane; and
    iii) instructions for merging those adjacent partitions that have identical associated subsets of said plurality of planes;
    iv) instructions for compositing pixels for each of said partitions from corresponding pixels of said associated subset of planes to render said image on said target surface using said graphics processor.

11. The computer readable medium of claim 10, wherein said processor executable instructions further comprise instructions for providing partition coordinates and an identifier of said associated subset of planes for each of said partitions to a processor.

12. The computer readable medium of claim 10, wherein said processor executable instructions further comprise an application programming interface for use by an application software to execute said instructions.

13. The computer readable medium of claim 12, wherein said application programming interface comprises data structures representative of said plurality of said planes, said processor executable instructions further comprising instructions for receiving said data structures representative of said planes from said application software.

14. The computer readable medium of claim 13, wherein said processor executable instructions further comprise at least one of:
  instructions for selectively tagging a surface to be used for passing said planes using a defined surface format;
  instructions for making a de-interlacing and sub-stream compositing call with a private globally unique identifier;
  instructions for passing a compressed buffer of planes to a decoding routine defined in a first standard software interface for using hardware-acceleration to speed up video processing, along with another private globally unique identifier; or
  instructions for using a second standard software interface, containing standalone APIs for decoding, processing, and capturing video, defined for using hardware-acceleration to speed up video processing.

15. A device comprising a processor in communication with memory, said memory storing processor executable instructions comprising:
  instructions causing said processor to receive a plurality of planes to be composited to form an image on a target surface, divide said surface into strips bounded by a first set of edges corresponding to a first set of boundaries of each of said plurality of planes, and divide said strips into partitions by subdividing each of said strips along a second set of edges corresponding to a second set of boundaries of each of said plurality of planes, each partition made up of connected pixels to be composited from the same subset of said plurality of planes associated with said each partition, said partitions comprising at least a first partition to be composited from at least both said first and second planes; a second partition to be composited from at least said first plane but not said second plane; and a third partition to be composited from at least said second plane but not said first plane;
  instructions to merge those adjacent partitions that have identical associated subsets of said plurality of planes;
  instructions to composite pixels for each of said partitions from corresponding pixels of said associated subset of planes thereby rendering said image on said target surface.

16. The device of claim 15, wherein said processor executable instructions provide said processor with partition coordinates and an identifier of said associated subset of planes of said each partition, for each of said partitions.

17. The device of claim 15, wherein said processor executable instructions further comprise:
  instructions for providing a programming interface to an application software executing on said processor, said programming interface comprising data structures representative of said plurality of planes; and
  instructions for receiving said data structures representative of said planes from said application software.

18. The device of claim 15, wherein said processor comprises a central processing unit in communication with a graphics processor.

19. The device of claim 15, wherein said processor comprises a graphics pipeline having a plurality of stages.

20. The device of claim 19, wherein a plurality of buffers comprising an index buffer, a vertex buffer, a texture buffer and a constant buffer are formed inside said memory; and said stages comprise at least one of a vertex shader, a rasterizer, a pixel shader or an output merger.

21. The device of claim 20, and said processor renders said image in a single pass.

22. The device of claim 21, wherein said processor executable instructions further comprise:
  a first software component; a second software component; and a programming interface from said first component to said second component;
  said programming interface operable to communicate all required data for rendering said image in said single pass from said first component to said second component.

23. The device of claim 22, wherein said required data comprise at least one of:
  a de-interlacing method; scaling factor; color format of said plurality of planes; color format of said image or luma keying data.

24. The device of claim 15, further comprising a drive in communication with said processor for reading a video stream stored on a disc wherein each of said plurality of planes is formed by decoding said video stream.

25. The device of claim 24, wherein said disc is one of a DVD, Blu-ray Disc, HD DVD and VCD.

26. The device of claim 15, wherein said plurality of planes are received from a broadcast source via one of a digital television, Internet TV, satellite receiver and set-top box.

27. The device of claim 15, wherein said plurality of planes is obtained from a video stream received via one of a network, video cable and an optical cable.

28. A processor-implemented method of compositing a plurality of planes comprising at least a first plane and a second plane onto a target surface, said method comprising, at least one processor:
  i) dividing said surface into polygonal partitions, each partition made up of connected pixels to be composited from the same subset of said plurality of planes associated with said each partition, at least one of said partitions having a height and a width of more than one pixel; said partitions comprising at least a first partition to be composited from at least both said first and second planes; a second partition to be composited from at least said first plane but not said second plane; and a third partition to be composited from at least said second plane but not said first plane;
  ii) compositing pixels for each of said partitions on a partition-by-partition basis from corresponding pixels of said associated subset of planes to render an image on said target surface.

29. The method of claim 28, further comprising providing said processor with partition coordinates and an identifier of said associated subset of planes for each of said partitions after said dividing.

30. The method of claim 29, wherein said plurality of planes is composited in a single pass by said processor.

31. The method of claim 28, comprising providing processor instructions to said processor for execution for said dividing and said compositing pixels for each of said partitions.

32. The method of claim 28, wherein said surface and each of said partitions are in the shape of one of: a triangle, a rectangle and another shape formed from at least two triangles.

33. The method of claim 32, wherein said dividing comprises:
  forming horizontal strips bounded by horizontal edges on said surface, each of said edges corresponding to top and bottom boundaries of said each of said plurality of planes; and
  forming said partitions by subdividing each of said horizontal strips vertically along left and right boundaries of each of said plurality of planes.

34. The method of claim 32, wherein said dividing comprises:
- forming vertical strips bounded by vertical edges on said surface, each of said edges corresponding to left and right boundaries of each of said plurality of planes; and
- forming said partitions by subdividing each of said vertical strips horizontally along top and bottom boundaries of each of said plurality of planes.

35. The method of claim 33, further comprising merging adjacent ones of said partitions that have identical associated subsets of said plurality of planes prior to said providing said partition coordinates.

36. The method of claim 34, further comprising merging adjacent ones of said partitions that have identical associated subsets of said plurality of planes prior to said compositing pixels for each of said partitions.

* * * * *